Nov. 8, 1949     C. L. GOUGLER     2,487,703
PRESS FOR MOLDING BATTERY BOXES
Filed April 5, 1947     3 Sheets—Sheet 1
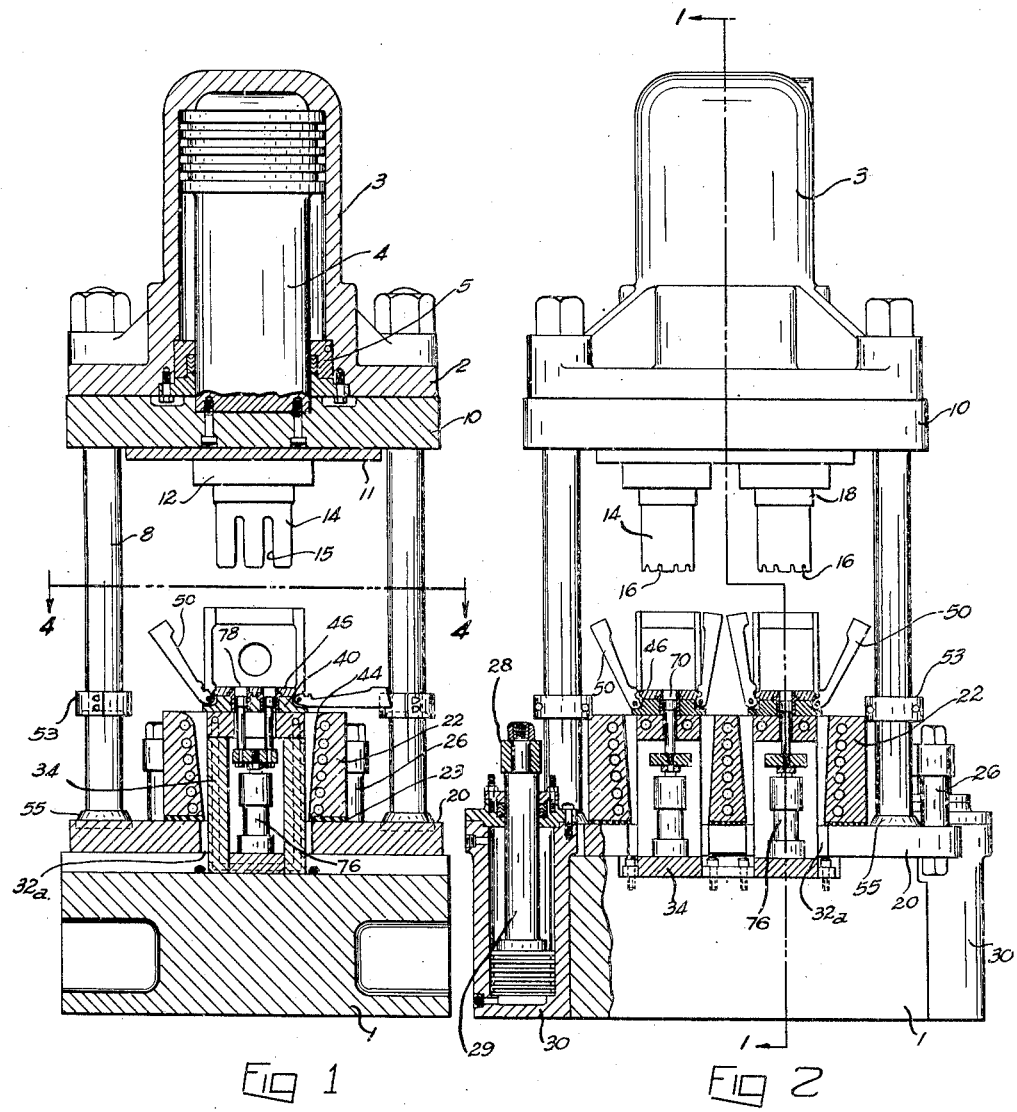
INVENTOR
CHARLES L. GOUGLER Nov. 8, 1949     C. L. GOUGLER     2,487,703
PRESS FOR MOLDING BATTERY BOXES
Filed April 5, 1947     3 Sheets-Sheet 2
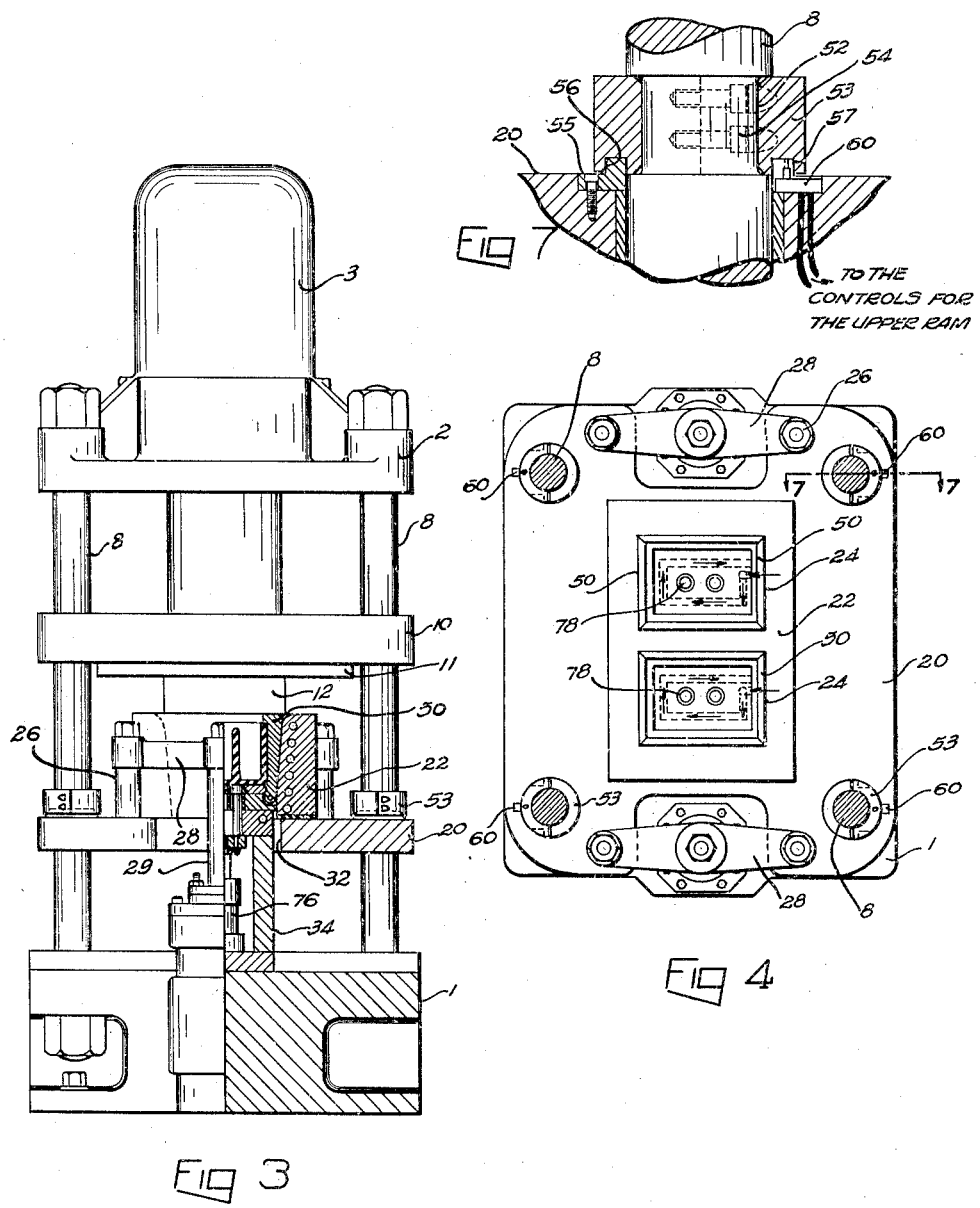
INVENTOR
CHARLES L. GOUGLER
ATTORNEYS

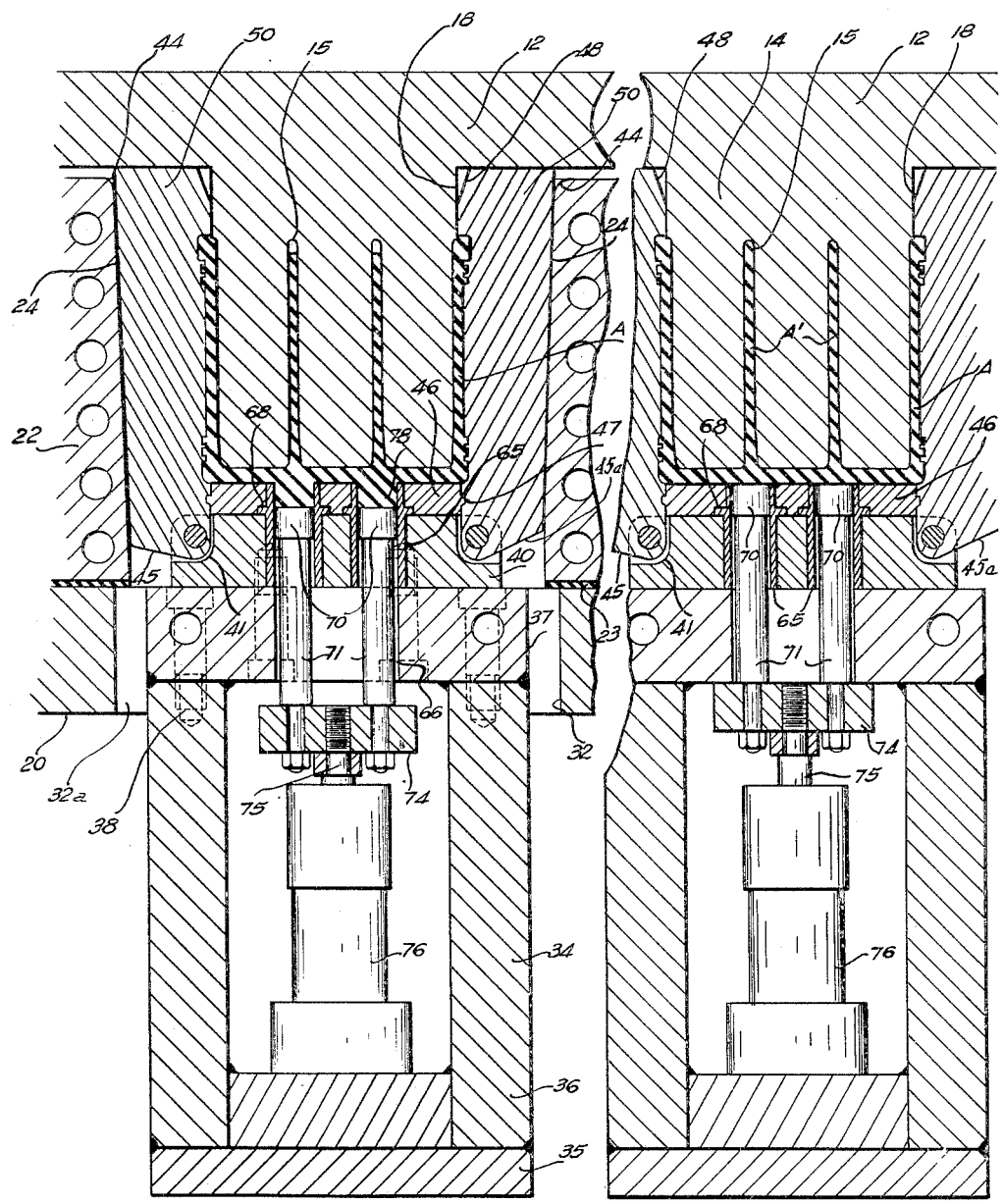

Patented Nov. 8, 1949

2,487,703

UNITED STATES PATENT OFFICE 2,487,703

PRESS FOR MOLDING BATTERY BOXES

Charles L. Gougler, Pasadena, Calif., assignor to The C. L. Gougler Machine Company, Kent, Ohio, a corporation of Ohio Application April 5, 1947, Serial No. 739,552

18 Claims. (Cl. 18—19)

The present invention relates to improvements in presses for molding plastic materials. While the apparatus shown and described herein is designed and intended for the molding and curing of battery boxes made from hard rubber or similar plastic materials, certain features of the invention have a wider application, and may be employed in connection with other plastic molding arts.

Presses which have been most generally used for the molding of battery boxes employ an outer one piece jacket or mold frame, a mandrel or core which is moved into and out of mating relation with the frame and pivoted side plates which are in vertical position within the jacket while the box is being molded, but are separated from the jacket and fall away from the box when the press is open. The usual procedure is to raise and lower a bottom plate to which the side plates are attached, the outer jacket remaining stationary. One of the objections to this arrangement is that bits of dirt, refuse, particles of rubber or the like, will collect in the bottom of the frame and along the side thereof and it is very difficult to remove them. The result is that the debris often accumulates in the frame to a degree which prevents the side plates from closing tightly and accurately as the press is closed. The displacement of the side plates not only causes the production of defective boxes, but may also cause the mold plates or the jacket to become distorted, split, or broken by the heavy pressure which is exerted by the hydraulic ram which forces the molding elements together.

In the apparatus shown herein the procedure is reversed, and instead of raising and lowering the base plate with its pivoted side plates, the outer jacket or mold frame is moved and the side plates are mounted on an immovable pedestal carried by the bed plate. By arranging the parts in the manner stated, a passage or throat is provided opening downwardly around the pedestal, and it is very easy to brush any debris which may be left at the end of a molding operation down through this passageway.

In the press shown herein it is intended to chrome-plate the inner surface of the jacket and the outer surfaces of the side plates so that these mating surfaces are non-corrosive and bits of rubber will not cling to them. However, even with this precaution, foreign matter will lodge in the jacket or on the outer faces of the side plates and thus prevent the side plates from absolute closing when the mold frame is elevated. If the main ram which carries the core is operated while the other parts of the mold are only partially closed, the immense pressure exerted by the core-ram will distort and may break the side plates, or the box will be defective. One of the objects of the invention is to provide means which will insure that the ram which moves the core into the mold cavity will be arrested or will not operate until the side plates are properly and tightly closed.

This latter object is attained in the press shown herein because the movable outer mold frame will not complete its upward travel if there is any foreign material lodged between the outer surfaces of the plates and the inner surface of the mold frame. Broadly stated, the movement of the core or mandrel is controlled by the movement of the outer mold frame. In the specific form of the invention shown herein, microswitches are located between a stationary portion of the press and a portion of the movable frame and until the frame is fully "home," which means that the side plates are tightly closed, the switch is not energized. When the frame is "home," the switch operates or releases the valves which control the admission of pressure to the core-ram.

A further object of the invention is to reduce the loss due to excessive overflow or flash which is created by the flow of the hot plastic stock out through the crevices or cracks around the mold cavity. It is the usual practice to load a mold cavity with an excess of the uncured stock so as to be certain that the stock will fill out the cavity. By insuring that the mold is tightly closed before the upper or core-ram descends, it is unnecessary to load the mold with an excess of raw stock, and therefore the loss due to rinds or flashes is reduced.

One of the major contributing factors to the high cost of molding battery boxes is the rejects caused by uneven and non-uniform wall thickness. Presses of this type are large and rugged and there are no precision fits between the moving parts. The pressures exerted are very high, especially as the mandrel completes its downward stroke. The press is heated to vulcanize or set the stock to about 300° F., so any sliding parts are necessarily provided with loose or "sloppy" fits.

All of the foregoing factors tend to the production of off-size or non-uniform boxes, particularly to the production of boxes with non-uniform side walls. Yet the inspection requirements on finished boxes are very exact and the manufacturer is held to tolerances within a few thousandths of an inch.

In presses used prior to the advent of this press, the final molding pressure is exerted on the stock as the plunger or core is moving into its final position. On the contrary in the press shown herein, the final molding pressure or "final squeeze" which compresses the stock and drives it into the innermost recesses of the molding cavity is not exerted upon the stock until after the core is in its final position. As a result the core moves into its final position in the closed mold without the exertion of excessive pressure which permits an accuracy of fit at all of the meeting lines around the molding cavity and an accurate centering of the core within the cavity.

In the specific form shown this is accomplished by providing one or more auxiliary plungers in each molding cavity, these plungers being located in relatively small pockets that readily fill up with some of the stock when the core enters the mold cavity. Then after the core is fully seated, the auxiliary plungers move in the pockets forcing the stock which has been trapped in the pockets into the cavity and thus exerting the final squeeze.

A further advantage of the design shown and described herein is that by moving the outer mold frame downwardly as the press is opened, the top of the pedestal on which the finished box rests comes at about the proper level for the average workman to operate efficiently while standing on the floor. No pits for the lower part of the press and no platforms for the workers are required, and the overall height of the press is reduced.

A still further advantage of the novel arrangement of the mold frame, the stationary pedestal and the core-ram is that by shifting the mold frame downwardly the side plates are never within the range of movement of the ram. In old types of presses in which the frame is stationary and the side plates are elevated to free the finished box, the side plates are elevated into the path of the ram so that accidental lowering of the ram will ruin the side plates. The side plates are the most vulnerable parts of a battery box press and it has not been an uncommon occurrence for a careless operator to start the lowering of the core ram before the side plates are withdrawn into the mold frame. With the press shown herein, untimely lowering of the core-ram can do no harm because the side plates are never in the path of the ram.

The press shown and described herein molds the box right side up, and certain of the features of the invention are especially adapted to presses of this type, but many of the features are also adaptable to presses of the upside-down type in which the box is molded in reverse. The invention is not, therefore, restricted to the right-side-up type of press. Also the press as shown is of the dual type in which two battery boxes are molded simultaneously, although this is not essential as the invention may be used with a single mold cavity or with more than two cavities.

The control mechanisms by which the pressure is admitted to and exhausted from the several rams, the timing mechanism, and the piping and valves by which these elements are operated in their proper sequence are not shown or described as they form no part of the invention and the designing of such parts and appurtenances is well within the province of any engineer familiar with this art.

The drawings and the accompanying description are of the invention in its best known or preferred form, but this is not to be taken as limiting the scope of the invention in any way. Changes, improvements, and modifications may be made in specific embodiments without departing from the scope of the invention as set forth in the claims appended hereto.

In the drawings:

Fig. 1 is a vertical section taken through the press on the line 1—1 of Fig. 2. In this view the press is open and the operator is assumed to be standing at the right side of the press.

Fig. 2 is a view at right angles to Fig. 1, portions of the press being shown in section.

Fig. 3 is a view similar to Fig. 1, but showing the press closed.

Fig. 4 is a horizontal section on the line 4—4 of Fig. 1. In this view the outer mold frame is raised.

Fig. 5 is an enlarged vertical section taken through the closed mold and the pedestal, this view showing the auxiliary plungers in their lowered position.

Fig. 6 is a view similar to Fig. 5, but showing the auxiliary plungers raised.

Fig. 7 is an enlarged section on the line 7—7 of Fig. 4 showing the control for the upper or main ram.

The numeral 1 is applied to the bed plate or base of the press and the numeral 2 to the upper stationary cross-head which is provided with the large cylinder 3 in which the upper or main ram 4 is reciprocated by hydraulic pressure. Suitable packing gland 5 is located at the base of the cylinder.

The cross head 2 and the bed plate 1 are connected by four heavy strain rods 8 located at the four corners of the press. These strain rods form the guides on which the movable cross-heads slide during the opening and closing of the press.

Attached to the ram and guided on the rods 8 is the movable cross head 10 which supports a plate 11 on which are mounted the mandrels or cores 12 which force the raw rubber or other plastic into the molding cavities. As shown, there are two mandrels and as the article to be molded is a multiple-cell battery box, the main body 14 of each mandrel is formed with narrow slits 15 opening downwardly to form the thin intermediate walls A' of the battery box A which has been selected as exemplary of any type of battery box or other article to be molded. The lower side of the mandrel is grooved as at 16 to form the ribs on the base of the box on which the battery plates rest. Around the top of the main body of each mandrel is a shoulder 18 which fits tightly within the upper portions of the side plates 50 to be described.

Slidably mounted on the lower portions of the rods 8 is the lower movable cross-head 20, to the upper side of which is attached the mold frame or jacket 22. An insulating layer 23 may be interposed between the mold frame and the crosshead 20.

As shown more particularly in Fig. 4, this mold frame is a single, one-piece casing which is provided with the two cavities 24 that enclose the side plates 50. It is a heavy casting because it has to withstand the pressures which are exerted when the mandrel is driven home and the final squeeze exerted on the box. It is cored for the circulation of steam and the inner faces of the cavities 24 are accurately machined to fit the tapering outer faces of the side walls.

The cross-head 20 is suspended from the lower ends of two pairs of vertical posts 26, each pair being carried by a horizontal beam 28. Each beam 28 is mounted on the upper end of a piston 29 which is reciprocated by hydraulic pressure in a ram 30 secured at the lower side of the bed plate 1. As shown in the drawings, the cross-head 20 is raised when the mold is closed and lowered when it is open.

Beneath each mold cavity 24 the cross-head 20 is apertured as indicated at 32, and mounted on the base 1, centrally of each aperture, is a rigid pedestal indicated as a whole at 34 which, as shown in Figs. 5 and 6, is formed of a base 35, side members 36, and a top plate 37 welded together and further strengthened by bolts indicated at 38. The top plate 37 is cored for the circulation of steam at the bottom of the mold cavity. Attention is particularly directed to the fact that the pedestal is substantially smaller than the opening 32 in the cross-head so that a substantial space 32a is provided at all sides of the pedestal. This space forms a throat or passageway entirely around each mold cavity through which any dirt or debris from the molding operations may be removed from the cavity. A collection of debris discharged from the mold cavity is indicated in Fig. 1. In prior art presses of the type in which the frame is stationary and the side plates move upwardly to eject the finished box, the refuse and dirt from the curing operations collects around the bottom of the cavity, and while it is the duty of the operators to see that this debris is removed after each operation, it is difficult to get all of this material out of the cavity. By lowering the mold frame after each molding operation, it is possible to provide a downward escape for the refuse.

Secured to the top plate 37 on each pedestal is a base 40, the upper edges of which are cut away to provide recesses 41 in which are located the pins 42 on which the several side plates 50 are pivoted. There are four of these side plates for each mold cavity, the outer surfaces of which are tapered to fit the taper on the adjacent inner wall of the mold frame.

The taper of the side plates causes them to be unbalanced so that when the mold frame is lowered the plates drop outwardly to free the completed box, as shown in Figs. 1 and 2. The downward movement of each plate is arrested by contact of a beveled surface 45 on the lower side thereof with the base of the recess 41. As shown in Fig. 1, one plate of each set should drop to a horizontal or substantially horizontal position to enable the operator to remove the finished box. For this purpose each plate to the right, as shown in Fig. 1, is provided with a steeper taper 45a, which allows that plate to drop into a convenient position to permit the removal of the box. As the upward movement of the mold frame raises the side plates, it is desirable to round the upper edges of the cavities 24 as at 44.

It will be noted that the plates fall away on their pivots when the press is opened and, as they are fixed on the top of the stationary pedestal 40, they do not lie in the path of the mandrel or core and, even if the ram were lowered before the plates were raised, the mandrel will never come in contact with the plates.

In the form shown the base 40 is surrounded by a lower mold plate 46, the edges of which are formed with tapered ribs 47 which form registers with corresponding grooves in the side plates so that the side plates fit exactly when the mold cavity is closed. The upper edges of the side plates 50 are tapered as indicated at 48 so as to permit the entry of the shoulder 18 on the mandrel. It will be observed that the upper edges of the side plates form an abutment for limiting the descent of the upper cross-head 10.

In spite of the utmost care, bits of dirt, rubber, or the like will sometimes fall between the side plates and the mold frame or lodge at some other place in the press and prevent the full closing of the side plates. The mold frame cannot rise to its full extent unless the side plates 50 are tightly closed together for any other condition of the side plates will arrest the frame and the pressure in the cylinders 30 is relatively low so that the lifting force exerted thereby is not great enough to crack the plates or injure any other part of the press if some foreign matter should prevent the complete closure of the mold.

However, the operator may not observe that both sets of side plates are not completely closed and that the mold frame has not gone its full upward stroke and set the upper ram in motion, bringing the mandrels down into the partially closed mold. The press is provided with a positive control which will prevent the operation of the main ram 4 if such a condition occurs.

This is a new and novel feature in a press of this character, and in a broader sense is not confined to a press in which the mold frame is movable, as it may be adapted to older types of presses.

In the form shown the four posts or strain rods 8 are provided with grooves 52 in each one of which is secured the split collar 53, the sections of which are tightly clamped in position by the bolts 54. On the top of the cross-head 20 beneath each collar is a ring 55, the outer surface of which is provided with a tapered rib 56 to fit a correspondingly tapered groove 57 on the underside of the collar 53. (See Fig. 7.) These tapered surfaces act as dowels to center the cross-head 20 as it moves into its final position, the cross-head 10 being centered by the movement of the shoulders 18 into the tapered surfaces 48 on the mold plates.

In each ring 55 is located a micro-switch 60 which is connected to the control from the main or upper ram. It is not considered necessary to show the details of the control by which the admission of fluid pressure to the upper or main ram is governed, it being sufficient to indicate clearly that the operation of the several micro-switches governs the main ram. It is believed to be desirable to locate a micro-switch at each corner of the cross-head 20 and to provide that the main ram shall not operate until contact has been made at all four micro-switches, for the cross-head 20 may tilt or cock itself and close one or more of the switches even though there is some obstruction which prevents the complete closure of the side plates.

This control device is a valuable feature of the invention as it reduces the production of defective boxes and saves much breakage or warping of the side plates or mold frame occasioned by the forcible entry of the mandrel in an improperly closed mold. While the control switches 60 are shown in the cross-head 20, the controls may be placed at any point where they will be operated when the cross-head 20 completes its full upward stroke.

It is usual in presses of this type to advance the main ram with a relatively low pressure and then to change to a much higher pressure as the ram nears its final position. The press shown herein is intended to operate in this sequence, but it differs from the usual press in that the final or ultimate squeeze on the raw material is not performed by the main ram but by auxiliary plungers which are operated at high pressure after the mandrels are fully "home." These auxiliary plungers are shown more clearly in Figs. 5 and 6.

In the form shown, at each mold cavity two cylinders or tubes 65 are located in vertical openings in the plates 40 and 46 leading from the top of the plate 46 to the bottom of the plate 40 where they discharge in an opening 66 in the top plate 37 of the pedestal 34. Any of the stock which escapes around the plungers will be discharged through this opening. Shoulders 68 on the outside of the tubes between adjacent faces of the plates 40 and 46 hold the tubes in position.

In the tubes 65 are located the reciprocable plungers 70 carried on the upper ends of the vertical rods 71, the lower ends of which are secured to a cross-head 74 carried on the upper end of a ram 75 movable in a high pressure cylinder 76 which is located in the pedestal 34.

Until the exertion of the "final squeeze," the plungers 70 are in their lowermost position, shown in Fig. 5, which creates pockets 78 opening from the bottom of each molding cavity. After the mold frame is raised and before the main ram is lowered, or before the mold is closed, the operator places a charge of raw material of sufficient volume to fill the mold cavity on the plate 46. When the main ram descends, the mandrel will force the stock into the recesses of the molding cavity and, as the open pockets afford an easy escape for the plastic material, they will fill up at once. For the reasons explained, it is difficult to drive the stock into some of the remote or restricted regions of the mold cavity, and it has been attempted to show this by leaving the upper portion of the grooves 15 devoid of stock when the parts are in the position shown in Fig. 5. After the mandrel is fully seated, high pressure is exerted on the rams 75, causing the plungers 70 to rise to the level of the top of the plate 46 and forcing the last bit of stock into the molding cavity.

The number of pockets 78 and their location about the mold cavity and their capacity are all optional and may be governed by the peculiar characteristics of the article to be molded and the character of the stock. In the form shown where a three-cell battery box is being molded, two pockets have been shown located directly below the partitions in the box so that the force of the upward movement of the plungers will be exerted in direct alignment with the partition walls.

The operation of the press and the advantages attained thereby will have been evident from the foregoing. While the description has been quite detailed, the invention is not restricted to these details but may be incorporated in or adapted to presses of other designs. The feature of providing a pocket or recess which receives a portion of the molding material as the mandrel enters the mold and from which the molding material is injected into the mold cavity gives a combination of pressure molding and injection molding which makes for greater accuracy, more uniform production, and a higher condensation of the stock than has been obtainable with earlier forms of presses of this type.

What is claimed is:

1. A press for molding plastic materials comprising a stationary pedestal, side plates forming the outer walls of a molding cavity pivoted on the top of the pedestal, a movable cross-head, a mold frame on the cross-head, and raised thereby along the pedestal from a position below the molding cavity to a position surrounding and closing the side plates to form the molding cavity, a ram above the pedestal, and a mandrel depending from the ram and movable by the ram into and out of the molding cavity.

2. A press for molding plastic materials comprising a stationary pedestal, side plates forming the outer walls of a molding cavity pivoted on the top of the pedestal, a movable cross-head, and a mold frame on the cross-head, and movable thereby from a position below the molding cavity to a position surrounding the side plates, said mold frame and cross-head having a central aperture surrounding but larger than the pedestal to provide a downwardly discharging scavenging passage.

3. A press for molding plastic materials comprising a stationary pedestal, side plates forming the outer walls of a molding cavity pivoted on the top of the pedestal, a movable cross-head, and a mold frame on the cross-head surrounding the pedestal and providing a space therebetween, and movable thereby from a position below the molding cavity to a position surrounding the side plates, and a downwardly opening scavenging passage in the cross head communicating with said space.

4. A press for molding battery boxes comprising a stationary pedestal, side plates pivotally mounted on the pedestal, a vertically movable cross-head, a mold frame on the cross-head, said frame being raised by the cross-head to a position surrounding the side plates, said mold frame surrounding the pedestal and providing a space therebetween when the cross-head is lowered and a scavenging passage between the cross-head and the pedestal communicating with said space through which debris may be discharged downwardly out of the molding cavity.

5. In a press for molding plastic materials, a set of pivoted side plates forming the outer walls of a molding cavity, a mold frame movable relatively to the side plates to raise the side plates and hold them in closed position, a main ram, a mandrel carried by the main ram and movable into the molding cavity, and a plurality of devices located at spaced points about and in the path of the mold frame and operative to permit movement of the ram only when the side plates are moved to fully closed position by the mold frame.

6. In a press for molding battery boxes or the like, a set of pivoted side plates forming the outer walls of a mold cavity with the edges of the side plates in contact, a mold frame surrounding the side plates and holding the edges of the plates in close fitting contact, the frame and the side plates being movable relatively to one another, a main ram, a mandrel carried by the ram and movable thereby into the mold cavity, and means to prevent the movement of the ram if the edges of the plates are not held in close fitting contact by the mold frame, said last named means comprising a plurality of limit switches located around the perimeter of the mold frame and in position to be actuated by the frame.

7. In a press for molding battery boxes or the like, a pedestal, a set of pivoted side plates on the pedestal, said plates when raised forming the outer walls of a mold cavity with the edges of the plates in contact, a mold frame movable into telescoped relation to the side plates and thereby raising the plates and holding them in closed position, a mandrel movable into the mold cavity, and means responsive to the movement of the mold frame to prevent the operation of the mandrel until the mold frame has reached the limit of its said movement, said last named means comprising a set of electrical switches located at the corners of the mold frame and in position to be actuated when the frame has reached the upper limit of its movement all around the mold cavity.

8. In a press for molding battery boxes or the like, a set of pivoted side plates, said plates when raised forming the outer walls of a mold cavity, the outer surfaces of said plates being tapered, an outer mold frame with a tapered inner surface to fit the tapered surfaces of the mold plates, means to bring the side walls and the mold frame into nested relation, a mandrel movable into the mold cavity and means to prevent the entrance of the mandrel into the cavity unless the side plates and the mold frame are completely nested, said last named means comprising a set of electrical switches located at the corners of the mold frame and in position to be actuated when the frame has reached the upper limit of its movement all around the mold cavity.

9. In a press for molding battery boxes or the like, a stationary pedestal, a set of pivoted side plates mounted on the top of the pedestal, said side plates having tapered outer walls and when raised with the edges of the plates in contact forming a molding cavity, a vertically movable cross-head, a mold frame having tapered inner surfaces, means to raise the cross-head from a position below the top of the pedestal to raise the mold plates and hold them in raised position with their edges in contact, an upper ram, a mandrel movable by the ram into the molding cavity, and means controlling the movement of said ram, said means being actuated only when the cross-head is at the upper limit of its movement.

10. A press in accordance with claim 9 in which the means for controlling the movement of the ram comprises a plurality of limit switches located about the perimeter of the mold frame.

11. A press for molding battery boxes or the like from a charge of molding material, a plurality of pivoted side plates and a base, a mold frame movable into and out of position surrounding the plates, a mandrel adapted to enter the mold cavity formed by the side plates and the base to shape the charge of molding material, a pocket opening into the mold cavity and adapted to receive a portion of the charge from said cavity, and a plunger in the pocket and movable to force the material from the pocket into the mold cavity after the mandrel has completed its movement into the cavity.

12. A press for molding plastic material comprising walls and a base forming a mold cavity, an open pocket communicating with the mold cavity, a mandrel adapted to enter the mold cavity to form a chamber, a ram to force the mandrel into the chamber to drive the plastic material into the recesses of the chamber and into the pocket, and a plunger in the pocket and movable to eject the plastic material which has been forced into the pocket by the ram from the pocket into the chamber.

13. In a press for molding battery boxes or the like of plastic material, a base, side walls pivoted on the base, a mold frame, said side walls and frame being relatively movable to bring the frame into position surrounding the side walls to form a molding cavity, a mandrel adapted to enter the cavity and fit within the side walls to make a closed chamber, an open pocket communicating with the cavity, a ram to force the mandrel into the mold cavity and to drive some of the plastic material into the pocket, and means to eject the material from the pocket into the mold cavity.

14. A press in accordance with claim 13 in which the means to eject the material from the pocket is a second ram operable after the first named ram has completed its movement.

15. A press for molding battery boxes comprising a stationary pedestal, a set of side plates pivoted at the top of the pedestal, a lower cross-head, means to raise and lower the lower cross-head, a mold frame on the lower cross-head and movable to a position surrounding the side plates, an open pocket in the pedestal and in communication with the mold cavity, a plunger in the pocket, an upper cross-head, means to raise and lower the upper cross-head, a mandrel on the upper cross-head adapted to enter the molding cavity and fit within the upper edges of the side plates to form a closed molding chamber and means operatable after the chamber is closed to advance the plunger from a point below the bottom of the mold cavity to the top of the pocket to eject all plastic material from the pocket into the chamber.

16. A press for molding battery boxes from a charge of plastic material, comprising a stationary pedestal, a set of tapering side plates pivoted at the top of the pedestal, a lower cross-head, a mold frame with tapering surfaces to fit the tapering side plates, means to raise and lower the lower cross-head to bring the frame into and out of position surrounding the side plates, an upper cross-head, a mandrel on the upper cross-head, means to raise and lower the upper cross-head to bring the mandrel into and out of mating relation with the side plates, an auxiliary reservoir adapted to receive some of the charge of plastic material as the mandrel moves to its lowermost position and means to force the contents of the auxiliary reservoir into the closed mold cavity.

17. In a press for molding articles from plastic material, said press comprising a mold with separable side walls which when closed form a cavity with an open side, a pocket opening from the cavity, a mandrel to enter the open side and project into the cavity to force the material into the recesses of the cavity and into the pocket, means to move said mandrel, a device to prevent the entry of the mandrel into the cavity if the side walls are not fully closed, and means to force the material from the pocket into the cavity after the mandrel has reached the limit of its inward movement.

18. In a press for molding articles from plastic material, said press comprising pivoted side walls which when raised form a cavity with an open side, a pocket opening from the cavity, a movable mold frame to raise the side walls and hold them during the molding operation, a mandrel to enter the open side of the mold and project into the cavity to force the material into the recesses of the cavity and into the pocket, means to move the mandrel, a device to prevent the entry of the mandrel into the cavity if the side walls are not fully raised, and means to force the material from the pocket into the cavity after the mandrel has reached the limit of its inward movement.

CHARLES L. GOUGLER.

REFERENCES CITED

The following references are of record in the file of this patent:

UNITED STATES PATENTS

| Number | Name | Date |
| --- | --- | --- |
| 1,347,728 | Wills | July 27, 1920 |
| 1,832,020 | Hammer | Nov. 17, 1931 |
| 1,919,070 | McKay et al. | July 18, 1933 |
| 2,181,157 | Smith | Nov. 28, 1939 |
| 2,222,732 | Winegar | Nov. 26, 1940 |
| 2,423,914 | Wacker | July 15, 1947 |
| 2,454,961 | Booth | Nov. 30, 1948 |